United States Patent
Hookham-Miller

(10) Patent No.: US 8,166,401 B2
(45) Date of Patent: Apr. 24, 2012

(54) PROVIDING A PRESENTATION IN A REMOTE LOCATION

(75) Inventor: Peter Hookham-Miller, London (GB)

(73) Assignee: PHM Associates Limited, London (GB)

( * ) Notice: Subject to any disclaimer, the term of this patent is extended or adjusted under 35 U.S.C. 154(b) by 512 days.

(21) Appl. No.: 12/167,550

(22) Filed: Jul. 3, 2008

(65) Prior Publication Data

US 2009/0031221 A1    Jan. 29, 2009

(30) Foreign Application Priority Data

Jul. 3, 2007 (GB) .................................. 0712876.2

(51) Int. Cl.
    *G06F 3/16* (2006.01)
(52) U.S. Cl. .................. 715/730; 715/731; 715/732
(58) Field of Classification Search .............. 715/730, 715/731, 732
See application file for complete search history.

(56) References Cited

U.S. PATENT DOCUMENTS

| | | | |
|---|---|---|---|
| 6,834,195 B2 * | 12/2004 | Brandenberg et al. | 455/456.3 |
| 7,134,073 B1 * | 11/2006 | Fiedorowicz et al. | 715/235 |
| 7,185,044 B2 * | 2/2007 | Ryan et al. | 709/200 |
| 7,222,163 B1 * | 5/2007 | Girouard et al. | 709/219 |
| 2004/0107169 A1 | 6/2004 | Lowe | |
| 2004/0107401 A1 | 6/2004 | Sung et al. | |
| 2004/0168118 A1 | 8/2004 | Wong et al. | |
| 2004/0237032 A1 | 11/2004 | Miele et al. | |
| 2005/0086283 A1 | 4/2005 | Marshall | |
| 2005/0188403 A1 | 8/2005 | Kotzin | |
| 2008/0281675 A1 * | 11/2008 | Zhang | 705/10 |

FOREIGN PATENT DOCUMENTS

| | | |
|---|---|---|
| CA | 2230367 A1 | 2/1999 |
| EP | 1 801 711 A1 | 6/2007 |
| WO | WO 00/57308 A1 | 9/2000 |

OTHER PUBLICATIONS

Antonio De Donatis; "What is XLEFF? Part II—Benefits from using an XML Layout Engine"; http://www.xleff.org/article001p02.php; May 15, 2007.

* cited by examiner

*Primary Examiner* — William Bashore
*Assistant Examiner* — Gregory A Distefano
(74) *Attorney, Agent, or Firm* — Arent Fox LLP

(57) ABSTRACT

A method for providing computer readable instructions for a presentation in a remote location is disclosed. In the method non-editable computer readable instructions for a presentation at a remote location are received from a central data storage via a data network. A user at the remote location then provides at least one set of computer readable instructions that are associated with the presentation. A modified presentation is presented at the remote location based on the non-editable set of computer readable instructions and the associated computer readable instructions. The associated computer readable instructions can then be sent to the central data storage for use in at least one subsequent execution of the presentation.

18 Claims, 2 Drawing Sheets

PROVIDING A PRESENTATION IN A REMOTE LOCATION

BACKGROUND OF THE INVENTION

1. Field of the Invention

The present invention relates to providing data for a presentation in a remote location and in particular to providing from a central storage via at least one data network a modified presentation that can be presented at a remote location.

2. Description of the Related Art

A data processing apparatus such as a computer can be used to display and/or otherwise present content, such as graphical or multimedia presentation. A presentation can be presented to an audience of one or more based on computer readable instructions that are executed i.e. run in at least one processor of the computer. The presentation may relate to a number of different topics and given in different occasions. For example, the presentation may be provided for the purposes of education, training, a conference, marketing, festivity and so on.

A presentation can be used in a plurality of different locations and/or occasions. For example, a head office of a multinational company or an independent application provider may create a presentation that is to be used in a number of different countries. The data for the presentation may be distributed on an appropriate carrier medium, for example on a computer readable memory disk or card, or via a data network. In particular data networks facilitate substantially real-time communication of data between two or more remote entities. A good example of data networks suitable for such use is the Internet, although other data systems such as closed company networks can also be used for this purpose. The presentations can be provided as website, CD ROM and E-learning course tools.

Although generated centrally in one location based on the preferences of its creator(s) and the local requirements, a presentation may thus be experienced by people at a remote location where the preferences and requirements may be at least slightly or even totally different. For example, the language in which a presentation is created may not always be suitable for use in a remote location. Therefore, although it is desirable to be able to use the same format and basic data of a presentation to avoid duplication of any programming and maintenance work, it is also desirable to be able to modify the presentation to satisfy any local requirements there might be.

A presentation, or more particularly the software i.e. the computer readable instructions for the presentation can be created using appropriate programming languages and tools. A typical example of suitable programming languages is the Flash. Once programmed, it has traditionally been difficult to modify and/or amend the data afterwards, at least without special skills and knowledge of the used software, the program code written and the application itself. For example, a change from a language to other or addition of additional parts may have required rebuilding or reprogramming considerable portions of the program and/or changes in various levels of the finished program code. Still using the translation example, an average translator or even a user in the remote location does not posses the requisite skill and knowledge, and therefore the changes need to be done at the central location by specialists.

The additions or desired modification need to be communicated to the specialists, who then modify the program code accordingly, to their best capability. It is, however, possible that the instructions are incomplete and/or misunderstood, and therefore even the modified version does not satisfy the needs of the local organization and may contain errors. Also, even if the specialists in the central location follow the instructions and wishes from the remote location, it may be that the end results turns out be something that is not desired due to the lack of possibility to have intermediate checks as the reprogramming work progresses, and further rounds of reprogramming are needed. This all is time consuming, and increases the cost. Also, the end result may still not be satisfactory to the users in the remote location.

On the other hand, there may be a desire not to allow the local organizations to alter the core or the frameworks of the presentation, such as any aspects relating to the brand, style, name, safety instructions and so on. Therefore the central organization may wish to retain overall control how the presentation looks like and "feels", and also to be able to control any modifications made therein.

The herein described embodiments aim to address one or several of the above mentioned shortcomings and to enable remote users to modify centrally generated and controlled presentations.

SUMMARY OF THE INVENTION

According to an embodiment, there is provided a method for providing computer readable instructions for a presentation in a remote location, comprising receiving at a remote location via a data network from a central data storage non-editable computer readable instructions for a presentation;

providing in the remote location at least one set of computer readable instructions that are associated with the presentation;

presenting a modified presentation at the remote location based on the non-editable set of computer readable instructions and the associated computer readable instructions; and sending the associated computer readable instructions to the central data storage for use in at least one subsequent execution of the presentation.

In accordance with another embodiment there is provided a method for providing computer readable instructions for presentations in remote locations, comprising sending from a central data storage to a remote location non-editable computer readable instructions for a presentation;

receiving from the remote location at least one set of associated computer readable instructions that are adapted for the requirements of the remote location and are associated with the presentation;

storing the associated computer readable instructions at the central data storage;

receiving a request for the presentation from the remote location; and sending from the central data storage data that comprises the non-editable computer readable instructions and the associated computer readable instructions for presenting a modified presentation at the remote location.

In accordance with yet another embodiment there is provided a system for providing computer readable instructions for a presentation in a remote location, comprising a central data storage and at least one remote data processing device, wherein at least one remote data processing device is configured to execute computer readable instructions, to receive via a data network from the central data storage non-editable computer readable instructions for a presentation, to provide at least one set of computer readable instructions that are associated with the presentation, to present a modified presentation based on the non-editable set of computer readable instructions and the associated computer readable instructions, and to send the associated computer readable instructions to the central data storage, and the central data storage is configured to receive and store said at least one set of associated computer readable instructions, to receive a request for the presentation, and in response thereto to send data that comprises the non-editable computer readable instructions and the associated computer readable instructions for presenting a modified presentation.

In accordance with yet another embodiment there is provided a computer program comprising program code means that is adapted to perform any of the methods herein described.

In accordance with yet another embodiment there is provided a computer program product comprising program code means stored in a computer readable medium, the program code means being adapted to provide a presentation when the program is run on a computer, wherein the program code means comprise non-editable computer readable instructions for the presentation and at least one set of associated computer readable instructions that provide at least one modification to the presentation, the at least one set of associated computer readable instructions being received from a remote computer.

In accordance with a more specific embodiment, a request for execution of the presentation can be sent to the central data storage. In response, data that comprises the non-editable computer readable instructions and the associated computer readable instructions is received.

In accordance with a specific embodiment, at least one set of editable computer readable instructions associated with the presentation is received from the central data storage where after said received at least one set of computer readable instructions is edited to obtain said associated computer readable instructions.

At least one set of associated computer readable instructions may be provided to localise the content of the presentation based on specific requirements of the remote location.

The presentation may comprise a teaching or training tool for use in remote locations with differing requirements.

The modified presentation may be provided substantially in real-time as the modification of the presentation progresses.

The embodiments may provide various advantages. The remote users may be allowed to modify presentations while they can be prevented from modifying anything that goes into the core of the presentation. The person modifying the presentation can experience the effect of the modification substantially in real time and to correct any errors immediately, and thus time consuming rounds between the specialist programmers at the central location and remote users can be avoided. The easier modifications process may also be expected to provide savings in use of resources and the cost of generating localized presentations. The modification can be provided by persons with only limited understanding of the application and the program code behind it. Remote users can be provided with immediate feedback on any changes made and the edition may be provided in a 'what you see is what you get' environment.

BRIEF DESCRIPTION OF THE DRAWINGS

For a better understanding of the present invention and how the same may be carried into effect, reference will now be made by way of example only to the accompanying drawings in which.

DETAILED DESCRIPTION OF CERTAIN EMBODIMENTS

Figure 1:
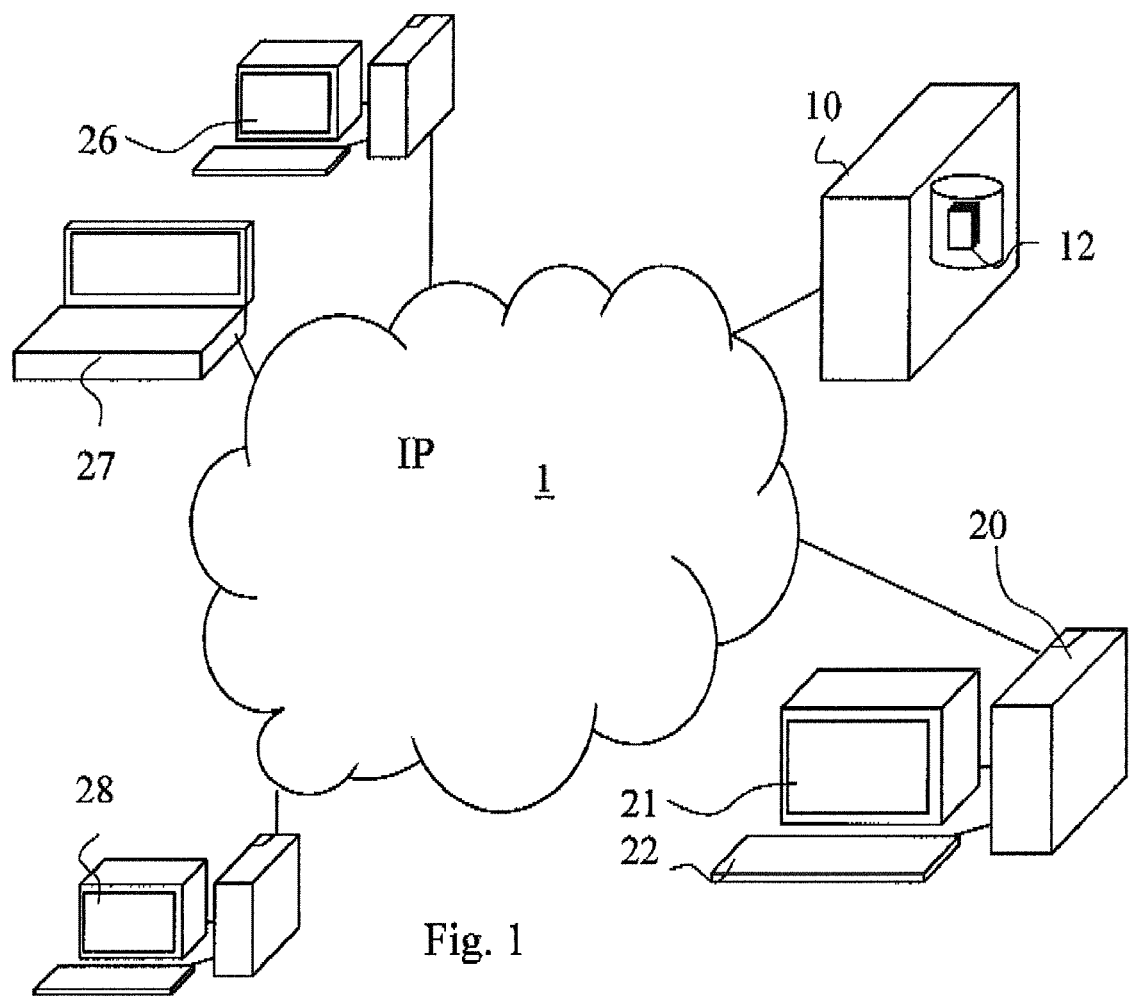
FIG. 1 shows a schematic presentation of a system comprising a data network and data processing devices connected therein wherein the invention may be embodied.

Before explaining in detail a few exemplifying embodiments, a brief explanation of certain general principles of data processing devices and communication of data via a data network is given with reference to FIG. 1.

A data processing device, for example a user terminal such as a desktop computer 20 or a laptop computer 27 can be used for processing data and executing computer readable instructions, such as computer program code. A data processing device can also be used for accessing various services and/or applications provided via a data network 1. A data network may be based on the Internet Protocol (IP) or any other appropriate data communication protocol for facilitating communication of data between at least two entities.

A data processing device can be provided with an access to a data network via an appropriate access interface between the data processing device and the data network. The access may be based on a fixed line connection, for example an ADSL (Asymmetric Digital Subscriber Line) or ISDN (Integrated Services Digital Network) connection or a wireless connection. Examples of the wireless connections comprise those based on local wireless area networks (WLAN), WiFi networks or connections via a mobile telecommunication system.

FIG. 1 shows a central data processing device 10 connected to the data network 1. The data processing device 10 provides a central data storage 12 for data associated with at least one presentation. The data processing device may be provided by a server or any other device capable of providing remote date processing devices with data via the data network upon request or otherwise. The server may be maintained for example by a service provider, a dedicated office of a multiple site organization or the like.

The central data storage 12 is for storing a master copy of a presentation comprising core data and related auxiliary data. The core data is provided based on a programming language that is relatively rigid, and is therefore "fixed" such that it can only be edited by the authorized personnel of the service provider with good knowledge and skills in performing any changes that may be required in the core features of the presentation. The rigidity may be required for various reasons, for example to protect the brand of a company from being misused by the local organisations, distributors or other partners thereof.

The auxiliary data, however, may be something that does not need such protection. Thus it can be provided by means of a second programming language that enables easy edition of the data. This can be utilized by the distributed users in tailoring the presentation to meet the local requirements.

FIG. 1 shows also a plurality of remote data processing devices 20, 26, 27 and 28 also connected to the data network 1. Each of the remote data processing devices provide users thereof with means for experiencing a presentation downloaded from the central storage 10. A remote device may comprise a user terminal such as a desktop personal computer 20, a laptop computer 27 or a mobile data processing device (not shown). The remote device such as any of the user terminals shown in FIG. 1 is typically provided with at least one data processing entity, or a processor, and at least one storage entity for use in tasks it is designed to perform. The data processing and storage entities (see entities 24 and 25 of FIG. 3) can be provided by means of at least one appropriate circuit board, hard drive, and/or chipset. A user may control the operation of the user terminal device by means of an appropriate user interface such as a key pad 22, voice commands, touch sensitive screen or pads combinations thereof or the like. A display 21, a speaker and a microphone (not shown) may also be provided. Furthermore, a user terminal may comprise appropriate connectors (either wired or wireless) to other devices and/or for connecting external accessories, for example audio-video and/or multimedia accessories, thereto.

It is noted that FIG. 1 shows an architecture to give an example of a possible data communication system where the embodiments described below may be provided and that other arrangements and architectures are also possible. For example, a user terminal may communicate via a number of different data networks with the central server. Some of the networks may be open (e.g. the Internet) and some private (e.g. local area networks).

Figure 2:
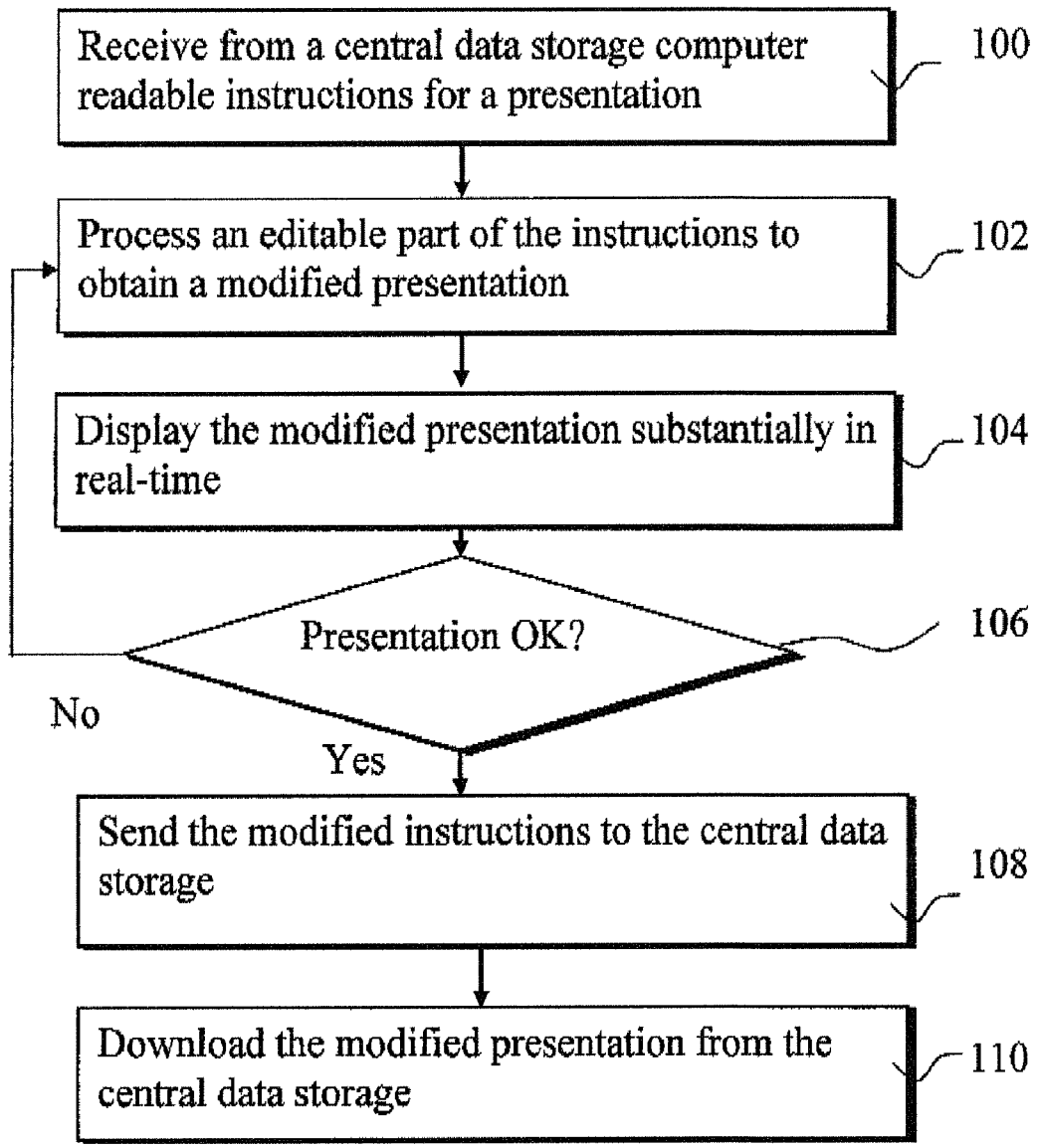
FIG. 2 shows a flowchart in accordance with an embodiment.

An exemplifying embodiment is now described with reference to the flowchart of FIG. 2. In the embodiment computer readable instructions for a presentation are generated and stored at a central data processing device. For example, the instructions may be stored at a server 10 of FIG. 1. The computer readable instructions can be downloaded to distributed remote computers for presentation of the content thereof in at least one remote location.

At step 100 a user of a remoter computer downloads from the central data storage via a data network data for a presentation. The data comprises at least one non-editable set of computer readable instructions. The data may also comprise at least one set of editable computer readable instructions. In accordance with an embodiment shown in more detail in FIG. 3 the non-editable data is provided by means of at least one Flash language file and the editable data is provided by means of at least one extended mark-up language (XML) file.

The remote user may then edit the presentation via the user interface of the remote computer, thereby instructing processing of the editable data at 102 and obtaining modified computer readable instructions that are associated with the presentation. For example, the user at the remote location may localize the presentation by translating at least a part of the presentation in the original language to a second language of the remote location, wherein the processing by the remote computer comprises replacing the original text with a translated text. Other examples of the localization based on specific requirements of the remote location by means of the editable computer readable instructions comprise editing the presentation and the underlying editable data to take into account any specific local legal requirements, local market conditions and specifications, local technical specifications, local terminology and local preferences. Processing of information regarding these aspects may comprise operation such as addition, deletion, changing and so on.

The user may review the modified presentation at any stage. Thus the presentation can be executed at 104 based on the received non-editable set of computer readable instructions and the latest modified computer readable instructions. If further modification of the presentation is desired at 106, the edition may continue at 102. If the display is provided substantially in real-time the remote user is provided with immediate feedback on the effect of any changes he makes. Thus the edition work may be provided in a 'what you see is what you get' environment.

Once the editing is completed, or even in the middle of it, the user may store the editable file. All versions of the presentation are stored at the central database at 108 to provide centralized version control. This assist in ensuring that there are no versions of the presentation in circulation and used by the remote users that are not under the control of a centralized presentation manager.

In certain embodiments only some predefined features of the presentation are displayed in real-time to the user as the editing work progresses. This may be desired e.g. due to reasons of limited processing capacity or display and/or audio equipment facilities.

If the user is satisfied, based on the test screenings, that the modified presentation is acceptable, the modified computer readable instructions can be sent to the central data storage at 110. The modified data can then be stored at the central storage for later use.

The editing may be performed such that every time the remote user accesses a specific screen to be translated, localized or otherwise edited, the entire screen is presented to him. The features available for edition are clearly marked, for example highlighted, on the screen. The user can then select the features he wished to work with, for example one by one or all at once. The remote user can then edit the features that he has selected for editing. At the end or in the middle of the editing process the user can save the work he has done, which triggers storing of the data at the central data storage. The remote user does not need to keep or store any files in the remote computer.

When the modified presentation is to be presented at the remote location, data for it can be requested and downloaded from the central data storage at 110. Data sent from the central data storage comprises the non-editable set of computer readable instructions and the modified computer readable instructions. The downloaded presentation will thus be the latest modified version of the presentation rather than the original presentation, or any intermediate versions thereof.

Figure 3:
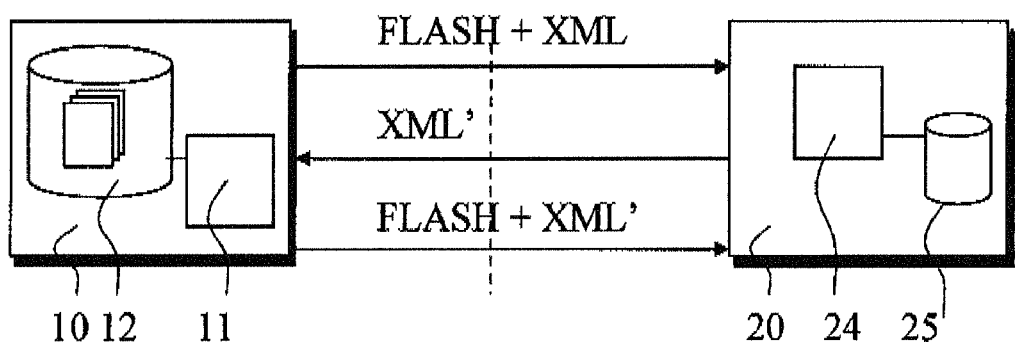
FIG. 3 shows signaling flows between a central and a remote data processing device in accordance with an embodiment.

FIG. 3 shows a specific embodiment wherein Flash and XML files are first downloaded to a remote computer 20. At least one XML file is then processed in the remote computer 20 to provide a modified file XML'. The modified XML' file comprises at least one edition such that a presentation based thereon is different from a presentation that is based on the original file XML. The modified file XML' is then sent to the central data processing device 10 for storage therein.

The XML' file is preferably assigned with an appropriate identifier so that it can be associated with the remote location of the remote computer and also with the relevant Flash file or files at the central data processing device. In response to a request for the presentation the Flash and XML' files are then downloaded at the remote computer. For example, use of a Flash file may call up a specific XML file. The files can be provided such that they have the same name for simplicity. For example, screen 3 of module 4 of the noneditable data can be named a 0403.swf file. This file can then reference to a 0403.xml file, and hence use of the 0403.swf file would lead to execution of 0403.xml file.

In accordance with an embodiment a processor 24 of the remote computer 20 is configured to automatically associate the modified data with the presentation. For example, the processor 24 may assign each modified or generated XML file with a unique identifier or name that associates the file with the non-editable data and/or the presentation. A specific folder structure that identifies what goes and where and with what may also be provided.

The central data processing device may associate the modification files it receives from the remote computers with an appropriate presentation and remote user for example based on specific storage locations. For example, each remote user can be associated with a specific storage area in a central server managing the presentation tool. The division of storage may be based on geography, language and particular presentation or group of presentations. For example, when user named 'Jens' logs in with his username and password, he only gets access to the geography 'Germany', language 'German' and the presentation 'XYZ'. According to the predefined area in the presentation tool, Jens will only be able to view and manipulate a specific set of files.

In the above embodiments the at least one set of editable computer readable instructions associated with the non-editable set of computer readable instructions was received from the central data storage where after said received at least one set of computer readable instructions was modified. In accordance with an embodiment only non-editable data is received at this stage and the step of providing the edited data comprises creation of computer readable instructions based on a template that is locally available or creation of an entirely new associated document. For example, the remote users may create a Word® document, a PowerPoint® presentation or the like that is associated with the presentation and sent it to the central storage. The association of the new files to the presentation may be based on unique identifiers such as file names. The associations may be provided manually or generated automatically by means of software instructions provided in the core data of the presentation.

For example, a translation may be input through a word processor software. The remoter user may receive a word processor interface when they access the editing part of the presentation tool. The interface can include basic formatting commands like bold, italic, bullets, align left/center/right, and so on. Edition of certain predefined aspects of the style such as typeface and font size may be limited.

In accordance with an embodiment the non-editable software is provided for the remote computer only once where after it is stored therein for later use. The editable files are sent back to the central data storage and downloaded from there when needed. When downloading, the remote computer displays and otherwise plays the presentation based on the non-editable software stored therein and the downloaded editable content. This has the advantage of reducing amount of data to be communicated while allowing a central control on any local modifications.

The following describes a possible example of use of the above described method and system. In this example the presentation comprises a teaching tool for use in remote locations with differing requirements. For example, the presentation may be a part of a learning program for regional or national offices of an organisation. This is termed in the following as an e-learning tool.

When a user in a remote location, such as a local sales office, downloads the e-learning tool for the first time, he gets a copy of master data comprising fixed core data and associated editable auxiliary data. The master data provides the user with the basic format i.e. the framework of the e-learning tool, for example the images, the style, presentation of the brand, any special visual and/or audio effects and so on. The downloaded version may be e.g. a United Kingdom (UK) version of the presentation that is based on the linguistic, legal, marketing and other aspects of the UK market. These aspects vary from a country to other, and therefore are provided in editable format in the auxiliary data. The user in the local office can edit the auxiliary data to adapt the presentation to the local requirements, for example to adapt the auxiliary data to the language, marketing and/or legal framework of a specific region or country. During and at the end of the localisation process the results of the adaptation can be displayed or otherwise made known in real time to so that the remote user knows how the functioning of the e-learning tool is altered. By means of this a need for time consuming editing rounds between the distributed users and central programming/administrator facility may be avoided.

After the editing is finished the edited auxiliary data is send back to and stored in a server of the head office, an external service or application provider or the like. Thereafter, whenever the e-learning set is needed for use in the particular remote location, the edited data is automatically downloaded, and the e-learning tool functions accordingly at the remote location in a localised manner.

In accordance with an embodiment the modified presentation can be distributed also otherwise than by downloading it from the data storage. For example, it can be saved on a CD ROM or disk, and delivered to a remote location by post or courier.

The above described functions may be provided by separate processors or by an integrated processor. Thus the required data processing functions for the modification, association and/or other related data processing may be provided by means of one or more data processors. An appropriately adapted computer program code product or products may be used for implementing the embodiments in the central and remote data processing devices, when loaded on an appropriate processor. The program code product for providing the operation may be stored, at least temporarily, on appropriate storage medium and provided, in addition to a download via a data communication system, by means of a carrier medium such as a carrier disc, card or tape.

It is noted that whilst embodiments have been mainly described in relation to fixed line data communication systems, the embodiments of the present invention are applicable to any other type of data communication system and processing apparatus suitable for data communication. It is also noted that although certain embodiments were described above by way of example with reference to certain exemplifying architectures for data networks, embodiments can be applied to any other suitable forms of data communication systems than those illustrated and described herein. It is also noted that the term data network is understood to refer to any data communication system configured for enabling communication of data between remote locations.

It is also noted herein that while the above describes exemplifying embodiments of the invention, there are several variations and modifications which may be made to the disclosed solution without departing from the scope of the present invention.

We claim:

1. A method for providing computer readable instructions for a presentation in a remote location by at least one wireless user terminal, comprising receiving, at a data processing device in a remote location via a data network from a central data storage, data comprising non-editable computer readable instructions and editable computer readable instructions for a presentation, wherein the non-editable computer readable instructions relate to a fixed part of the presentation and the editable computer readable instructions relate to an editable part of the presentation;

editing the editable computer readable instructions using an user interface of the data processing device in the remote location to generate at least one set of edited computer readable instructions that are associated with the presentation;

presenting substantially in real-time with the editing a modified presentation by the data processing device at the remote location based on the non-editable computer readable instructions and the associated edited computer readable instructions; and sending the associated edited computer readable instructions from the data processing device to the central data storage for sending to at least one wireless user terminal without sending the non-editable computer readable instructions for use in at least one subsequent execution of the presentation in the modified form by the at least one wireless user terminal.

2. A method as claimed in claim 1, comprising
sending a request for execution of the presentation to the central data storage; and
in response, receiving from the central data storage data that comprises the non-editable computer readable instructions and the associated computer readable instructions.

3. A method as claimed in claim 1, wherein the providing of the at least one set of associated computer readable instructions comprises localising the content of the presentation based on specific requirements of the remote location.

4. A method as claimed in claim 3, wherein the localising comprises modifying the associated computer readable instructions in view of at least one of language, local legal requirements, local market conditions, local technical and/or market specifications, terminology and local preferences.

5. A method as claimed in claim 1, wherein the presentation comprises a teaching or training tool for use in remote locations with differing requirements.

6. A method as claimed in claim 1, wherein the central data storage comprises a centrally managed server.

7. A method as claimed in claim 1, wherein the non-editable set of computer readable instructions is based on Flash files.

8. A method as claimed in claim 1, wherein the at least one associated set of computer readable instructions is based on extended mark-up language (XML) files.

9. A method as claimed in claim 1, comprising generating at least one set of the associated computer readable instructions at the remote location, and associating the generated at least one set with the presentation.

10. A method for providing computer readable instructions for presentations in remote locations, comprising
sending, from a central data processing device to a data processing device in a remote location, data comprising non-editable computer readable instructions and editable computer readable instructions for a presentation, wherein the non-editable computer readable instructions relate to a fixed part of the presentation and the editable computer readable instructions relate to an editable part of the presentation;
receiving at the central data processing device from the data processing device at the remote location at least one set of edited computer readable instructions that are edited from said editable computer readable instructions to adapt for the requirements of the remote location and are associated with the presentation;
storing the associated edited computer readable instructions at the central data processing device;
receiving a request for the presentation from at least one wireless user terminal at the remote location; and
sending, from the central data processing device to the at least one wireless user terminal, data that comprises the associated edited computer readable instructions without sending the non-editable computer readable instructions for presentation of a modified presentation by the at least one wireless user terminal at the remote location.

11. A system for providing computer readable instructions for a presentation in a remote location, comprising a central data storage and at least one remote data processing device, wherein
the at least one remote data processing device is configured to execute computer readable instructions, to receive via a data network from the central data storage data comprising non-editable computer readable instructions and editable computer readable instructions for a presentation, wherein the non-editable computer readable instructions relate to a fixed part of the presentation and the editable computer readable instructions relate to an editable part of the presentation, to generate at least one set of edited computer readable instructions by editing the received editable computer readable instructions that are associated with the presentation, to present substantially real-time with the editing a modified presentation based on the non-editable set of computer readable instructions and the associated edited computer readable instructions, and to send the associated edited computer readable instructions to the central data storage, and
the central data storage is configured to receive and store said at least one set of associated edited computer readable instructions, to receive a request for the presentation from at least one wireless user terminal at the remote location, and in response thereto to send data that comprises the non-editable computer readable instructions and the associated editable computer readable instructions for presenting a presentation, wherein the central data processing device is further configured to send to the at least one wireless user terminal data that comprises the associated edited computer readable instructions for presentation of the modified presentation by the at least one wireless user terminal without sending the non-editable computer readable instructions.

12. A system as claimed in claim 11, wherein the at least one remote data processing device is configured to localise the presentation based on specific requirements of the remote location by processing the associated computer readable instructions.

13. A system as claimed in claim 11, wherein the presentation comprises a teaching or training tool for use in remote locations with differing requirements.

14. A system as claimed in claim 11, wherein the central data storage comprises a centrally managed server.

15. An apparatus comprising at least one processor, and at least one memory including computer program code, wherein the at least one memory and the computer program code are configured, with the at least one processor, to
present at a remote location a presentation based on data received via a data network from a central data storage, wherein said data comprises non-editable computer readable instructions and editable computer readable instructions, wherein the non-editable computer readable instructions relate to a fixed part of the presentation and the editable computer readable instructions relate to an editable part of the presentation;
process, at the remote location, the received non-editable computer readable instructions to generate at least one set of edited computer readable instructions that are associated with the presentation;

present substantially in real-time with the generation of the edited computer readable instructions a modified presentation at the remote location based on the non-editable set of computer readable instructions and the associated edited computer readable instructions; and send the associated edited computer readable instructions to the central data storage for use in sending data to wireless user terminals at the remote location for at least one subsequent execution of the presentation to provide the modified presentation at the wireless user terminals, wherein the edited computer readable instructions are sent to the wireless user terminals without sending the non-editable computer readable instructions.

16. An apparatus as claimed in claim 15, wherein the apparatus is comprised in a mobile data processing device configured for communication via a wireless connection.

17. An apparatus as claimed in claim 16, wherein the apparatus comprises a touch sensitive screen or pad.

18. An apparatus comprising at least one processor, and at least one memory including computer program code, wherein the at least one memory and the computer program code are configured, with the at least one processor, to:

send from a central data processing device to a data processing device in a remote location data comprising non-editable computer readable instructions and editable computer readable instructions for a presentation, wherein the non-editable computer readable instructions relate to a fixed part of the presentation and the editable computer readable instructions relate to an editable part of the presentation;

receive from the data processing device at the remote location at least one set of edited computer readable instructions that are edited from said editable computer readable instructions to adapt for the requirements of the remote location and are associated with the presentation;

store the associated edited computer readable instructions;

receive a request for the presentation from at least one wireless user terminal at the remote location; and send in response to the request from the central data processing device to the at least one wireless user terminal data that comprises the associated edited computer readable instructions without sending the non-editable computer readable instructions for presentation of a modified presentation by the at least one wireless user terminal.

* * * * *